L. HECKMANN.

Assignor of part interest to W. H. WADE & E. P. DAVIS.

Ornamental Scroll-Work for Jewelry.

No. 8,300. Reissue-Design, June 25, 1878.

WITNESSES

B. W. Williams.

Jas. W. Reid Jr.

Louis Heckmann INVENTOR

By his attys.

Henry W. Williams & Co.

BEST AVAILABLE COPY

UNITED STATES PATENT OFFICE.

LOUIS HECKMANN, OF PLAINVILLE, MASSACHUSETTS, ASSIGNOR OF PART INTEREST TO WILLIAM H. WADE AND EDWARD P. DAVIS.

DESIGN FOR ORNAMENTAL SCROLL-WORK FOR JEWELRY.

Specification forming part of Design No. 10,288, dated October 30, 1877; Reissue No. 8,300, dated June 25, 1878; application filed June 13, 1878.

*To all whom it may concern:*

Be it known that I, LOUIS HECKMANN, of Plainville, in the county of Norfolk and State of Massachusetts, have originated and designed a Scroll-Work for Articles of Jewelry, of which the following is a full, clear, and exact description, reference being had to the accompanying drawings, making part of this specification.

This scroll-work is intended as a trimming for shawl-pins, ear-rings, lockets, &c., for the purpose of rendering the same more ornamental.

Figure 1:
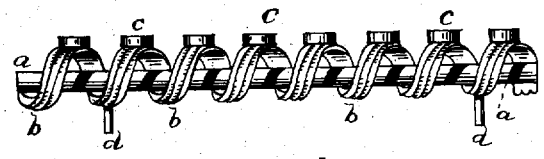
Figure 2:
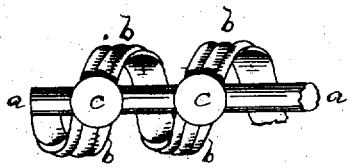

In the drawings, Figure 1 is a side elevation of a piece of scroll-work executed substantially according to my design. Fig. 2 is a plan of the same, and Fig. 3 a cross-section of the fluted band.

*a* represents a draft-rod, upon which runs the fluted band *b*, touching the said rod upon its under side at each coil.

*c c* represent caps placed upon the upper side of each coil of the fluted band. The shape of these caps is not material. In this illustration they are round.

Figure 3:
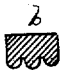

The entire band *b* is fluted or corrugated, as seen in Fig. 3. *d d* are merely pegs, for the purpose of attaching the trimming to the article of jewelry for which it is intended.

The rod *a* may be omitted, as it does not form an essential portion of my design.

What I claim, and desire to secure by Letters Patent, is—

The design for ornamental scroll-work for articles of jewelry, composed essentially of the fluted band *b*, provided with caps in the positions shown, said band being coiled in the shape of a scroll, substantially as described, and illustrated in the accompanying drawings.

LOUIS HECKMANN.

Witnesses:
ELLA I. BARDEN,
THOMAS A. BARDEN.